(12) United States Patent
Barsness et al.

(10) Patent No.: US 7,853,585 B2
(45) Date of Patent: Dec. 14, 2010

(54) MONITORING PERFORMANCE OF A DATA PROCESSING SYSTEM

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 11/082,925

(22) Filed: Mar. 17, 2005

(65) Prior Publication Data

US 2006/0212417 A1  Sep. 21, 2006

(51) Int. Cl.
G06F 17/30 (2006.01)
(52) U.S. Cl. ...................................... 707/721
(58) Field of Classification Search .................. 707/721
See application file for complete search history.

(56) References Cited

U.S. PATENT DOCUMENTS

| | | | |
|---|---|---|---|
| 4,905,171 A | 2/1990 | Kiel et al. | |
| 5,317,727 A | 5/1994 | Tsuchida et al. | |
| 5,515,531 A | 5/1996 | Fujiwara et al. | |
| 5,642,504 A * | 6/1997 | Shiga | 707/10 |
| 5,687,361 A * | 11/1997 | Sarkar | 707/1 |
| 5,819,066 A * | 10/1998 | Bromberg et al. | 707/102 |
| 5,832,484 A * | 11/1998 | Sankaran et al. | 707/8 |
| 5,847,972 A * | 12/1998 | Eick et al. | 709/246 |
| 5,852,818 A * | 12/1998 | Guay et al. | 707/1 |
| 5,864,871 A * | 1/1999 | Kitain et al. | 707/104.1 |
| 5,960,429 A * | 9/1999 | Peercy et al. | 707/5 |
| 6,026,391 A | 2/2000 | Osborn et al. | |
| 6,035,306 A | 3/2000 | Lowenthal et al. | |
| 6,052,694 A | 4/2000 | Bromberg | |
| 6,141,699 A | 10/2000 | Luzzi et al. | |
| 6,363,391 B1 * | 3/2002 | Rosensteel, Jr. | 707/102 |
| 6,381,628 B1 * | 4/2002 | Hunt | 709/201 |
| 6,434,533 B1 * | 8/2002 | Fitzgerald | 705/10 |
| 6,460,141 B1 * | 10/2002 | Olden | 726/4 |
| 6,522,939 B1 * | 2/2003 | Strauch et al. | 700/116 |
| 6,594,654 B1 * | 7/2003 | Salam et al. | 707/3 |
| 6,804,627 B1 * | 10/2004 | Marokhovsky et al. | 702/182 |
| 2002/0065795 A1 | 5/2002 | Asherman | |

(Continued)

FOREIGN PATENT DOCUMENTS

JP   2002-073431 A   3/2002

OTHER PUBLICATIONS

U.S. Appl. No. 09/605,467, filed Jun. 28, 2000, entitled "Method and System for Estimating Response Time Decomposition of Web Applications by Monitoring Performance of Deployed Applications Using General Instrumentation of Java Applications" by Robert Berry et al.

*Primary Examiner*—Neveen Abel Jalil
*Assistant Examiner*—Mark Andrew X Radtke
(74) *Attorney, Agent, or Firm*—Martin & Associates, LLC; Bret J. Petersen

(57) ABSTRACT

An apparatus and method for monitoring the performance of a computer system via an result size including a result set size of accesses to a database and a page size. Preferred embodiments are directed to a performance monitor that correlates data from existing tools that report data concerning access to the database and the use of system resources. Other embodiments are directed to a performance monitor that is included in an application server associated with the database.

2 Claims, 4 Drawing Sheets

| Application Resouce | SQL Operations | Rows Fetched | # of Feches | Page Size | Time m/s |
|---|---|---|---|---|---|
| Servlet 1 | 6 | 10 | 3 | 200 | 4000 |
| Servlet 1 | 6 | 5 | 3 | 200 | 2000 |
| Servlet 1 | 6 | 250 | 3 | 2000 | 40000 |
| Entity Bean | 1 | 10 | 1 | null | 3000 |
| Entity Bean | 1 | 10 | 1 | null | 3000 |
| Servlet 2 | 4 | 2 | 4 | 2000 | 3000 |
| Servlet 2 | 6 | 5 | 3 | 8000 | 10000 |

U.S. PATENT DOCUMENTS

| | | | |
|---|---|---|---|
| 2003/0046383 A1* | 3/2003 | Lee et al. | 709/224 |
| 2003/0078766 A1* | 4/2003 | Appelt et al. | 704/9 |
| 2004/0139100 A1* | 7/2004 | Gottsman | 707/102 |
| 2004/0172397 A1 | 9/2004 | Asherman | |
| 2006/0020579 A1* | 1/2006 | Freedman et al. | 707/3 |
| 2006/0053164 A1* | 3/2006 | Ewing et al. | 707/104.1 |
| 2006/0064408 A1* | 3/2006 | Enbutsu et al. | 707/3 |
| 2007/0124672 A1* | 5/2007 | Cragun et al. | 715/531 |

\* cited by examiner

| Thread ID | Time Stamp | Operation Type | Rows Fetched | SQL Text |
|---|---|---|---|---|
| 12 | 12:02 | IN | 0 | |
| 16 | 12:00 | FE | 4 | |
| 16 | 12:01 | UP | 0 | |
| 15 | 12:02 | FE | 3 | |
| 16 | 12:01 | FE | 4 | |
| 11 | 12:03 | FE | 2 | |
| 16 | 12:02 | IN | 0 | |
| 14 | 12:02 | IN | 0 | |
| 16 | 12:04 | FE | 4 | |
| 16 | 12:03 | DE | 0 | |

FIG. 2
(Prior Art)

| Thread ID | Start Time | Stop Time | Application Resource | Page Size |
|---|---|---|---|---|
| 16 | 12:00 | 12:04 | Servlet 1 | 200 |
| 12 | 12:02 | 12:03 | Servlet 1 | 200 |
| 22 | 12:03 | 12:05 | Servlet 2 | 2000 |

FIG. 3
(Prior Art)

| Application Resouce | SQL Operations | Rows Fetched | # of Feches | Page Size | Time m/s |
|---|---|---|---|---|---|
| Servlet 1 | 6 | 10 | 3 | 200 | 4000 |
| Servlet 1 | 6 | 5 | 3 | 200 | 2000 |
| Servlet 1 | 6 | 250 | 3 | 2000 | 40000 |
| Entity Bean | 1 | 10 | 1 | null | 3000 |
| Entity Bean | 1 | 10 | 1 | null | 3000 |
| Servlet 2 | 4 | 2 | 4 | 2000 | 3000 |
| Servlet 2 | 6 | 5 | 3 | 8000 | 10000 |

FIG. 4

MONITORING PERFORMANCE OF A DATA PROCESSING SYSTEM

BACKGROUND OF THE INVENTION

1. Technical Field

The present invention relates generally to monitoring performance of a data processing system, and in particular to an improved method and apparatus for monitoring performance of a data processing system via a result size.

2. Background Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various pieces of software are executing within the data processing system. For example, a performance tool may identify the most frequently executed modules and instructions in a data processing system, or may identify those modules which allocate the largest amount of memory or perform the most I/O requests.

A particular challenge in software troubleshooting is the periodic slowdown caused by accesses to a database. Because of the periodic nature of the problem, it is often difficult to determine the cause of the slowdown. There are prior art tools that provide information to a system analyst concerning a software operation and access to the database. One known software trace tool is a database monitor, which when activated keeps track of database events as they occur. This tool records data such as shown in FIG. 2 and described further below. Another known tool is an applications server log that records information about application threads being served by the applications server. This tool records data such as shown in FIG. 3 and described further below. These prior art tools can help a system analyst troubleshoot the cause of a periodic slowdown, but by themselves have severe limitations in helping the analyst isolate a periodic slowdown.

Therefore, it would be advantageous to have an improved method and apparatus for monitoring data processing systems and the applications executing within the data processing systems as they access databases. Without a way to analyze and improve system performance, the computer industry will continue to suffer from excessive costs due to poor computer system performance.

DISCLOSURE OF INVENTION

An apparatus and method are described for monitoring the performance of a computer system via an result size including a result set size of accesses to a database and page size. Preferred embodiments are directed to a performance monitor that correlates data from existing tools that report data concerning access to the database and the use of system resources. Other embodiments are directed to a performance monitor that is included in an application server associated with the database.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is a diagram of a data block that represents data returned by a database monitor in accordance with the prior art;

FIG. 3 is a diagram of a data block that represents data returned by an application server log in accordance with the prior art;

FIG. 4 exemplifies a data output table from the performance monitor showing the performance via the result set size according to a preferred embodiment;

BEST MODE FOR CARRYING OUT THE INVENTION

A system, method, and computer readable medium are provided for performance monitoring of data processing systems and applications executing on the data processing system. In a preferred embodiment, information is collected about the application from an application server log and from a database monitoring program. This information is then processed to determine performance based on the result size. The result size may include result set size of data accesses to the database and page size. A suitable computer system is described below.

Figure 1:
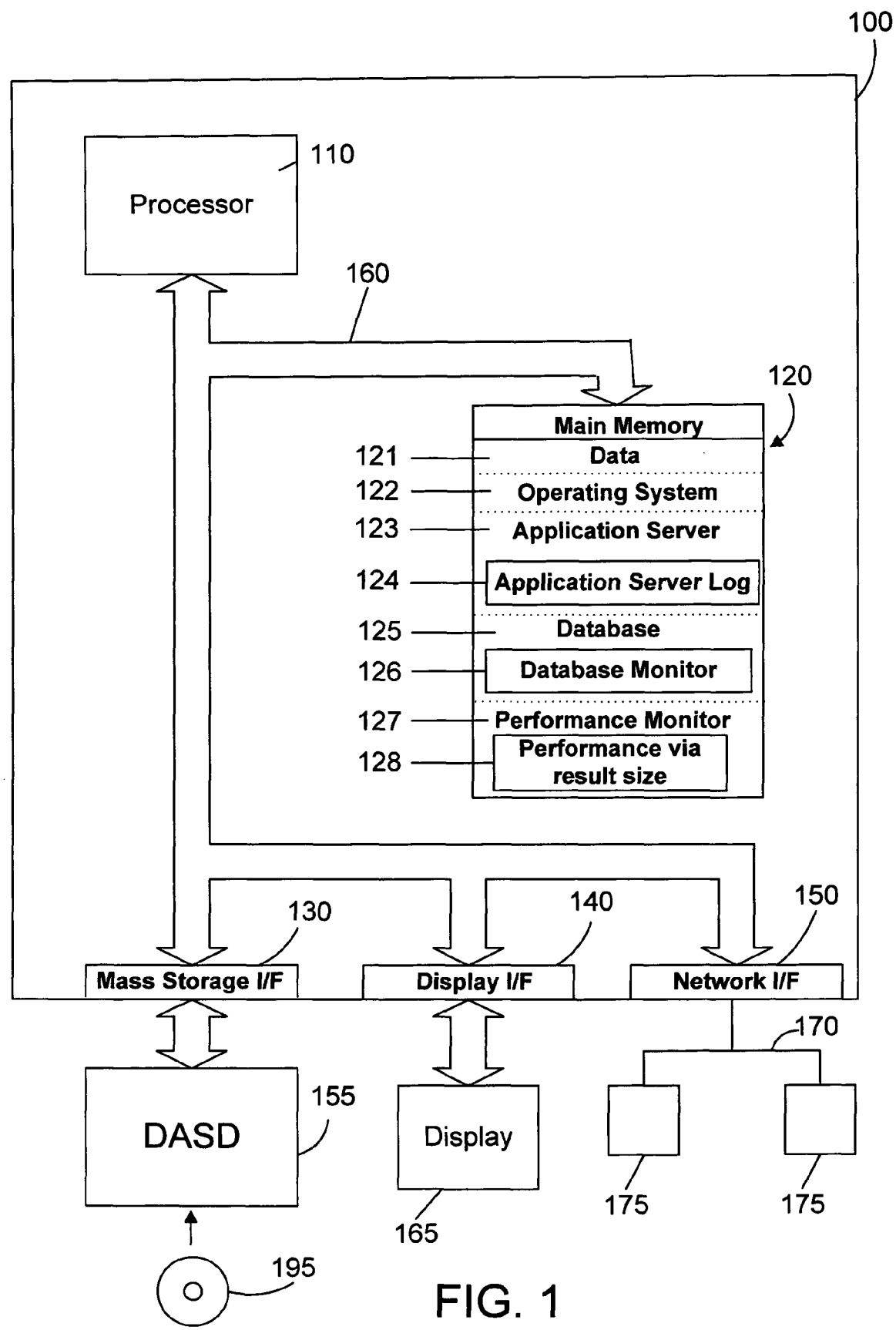
FIG. 1 is a block diagram of an apparatus in accordance with the preferred embodiments.

Referring to FIG. 1, a computer system 100 is shown in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

Main memory 120 in accordance with the preferred embodiments contains data 121, an operating system 122, an application server 123, a database 125 and a performance monitor 127. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. The application server 123 is a software program operating in the system that processes software application servlet calls over the network. The application server has an application server log that stores a history of program calls that have been served by the application server 123. The database 125 includes a database monitor 126 such as those known in the prior art. The database may be distributed across the network, and may not reside in the same place as the application software accessing the database. In a preferred embodiment, the database primarily resides in a host computer and is accessed by remote computers on the network which are running an application with an internet type browser interface over the network to access the database.

The performance monitor 127 is a software tool for monitoring the performance of a computer system that accesses a database. The performance monitor 127 includes a performance via result size 128. The performance via result size in preferred embodiments is determined by analyzing data from the application server log 124 and the database monitor 126. The performance monitor 127 is described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, application server 123, database 125 and the performance monitor 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100. Thus, while in FIG. 1, the application server 123, the database 125 and the performance monitor 127 are all shown to reside in the main memory 120 of computer system 100, in actual implementation these software components may reside in separate machines and communicate over network 170.

At this point, it is important to note that while the present invention has been and will continue to be described in the context of a fully flnctional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

With reference now to FIG. 2, data block 200 depicts data associated with access to the database 125 acquired by a prior art database monitor 126 in the data processing system 100 (FIG. 1). Each row in data block 200 includes information for an access to the database by a specific thread of software indicated by a thread ID 210. In a preferred embodiment, information about the access to the database included with each thread ID is a time stamp, an operation type, the number of rows fetched, and the SQL text. Other information may also be included by the database monitor 126. The time stamp is the time that the thread accessed the database. The operation type is the type of SQL operation used to access the database (open (OP), fetch (FE), close (CL), insert (IN), delete (DE), etc.). A large result size for an SQL query means a large number of rows were fetched from the data base. When rows are fetched from the database the fetch operations is indicated with "FE" in the "operation type" column of the data block shown in FIG. 4. The SQL text column lists the text of the SQL query used to access the database associated with the respective thread ID. This column is not populated for the present example in FIG. 2.

With reference now to FIG. 3, a data block 300 depicts information typically stored in an application server log 124. The information in the application server log 124 is supplied by a prior art application server 123, which is part of the data processing system 100 (FIG. 1). Each row in data block 300 includes information for a request to the application server 124 by a specific thread of software indicated by a thread ID 310. Information that is typically included in the application server log includes a start time, a stop time, an application resource and a page size. The start and stop time indicate the time the application resource was being processed by the application server. The page size indicates the size of the dynamic page generated by the application server for the associated process indicated by the thread ID.

FIG. 4 represents an example output of the performance monitor 127 (FIG. 1) according to a preferred embodiment. In a preferred embodiment the performance monitor processes data in FIG. 2 in conjunction with the data in FIG. 3 into the data block as shown in FIG. 4. The details of the generation of the data block 400 are described further below. The data block 400 in FIG. 4 allows the computer analyst to determine where system resources are being used and to. pinpoint possible causes of periodic slowdowns. The data block 400 has a number of rows of information that relate to an application resource listed in the first column. The data shown in FIG. 4 is not comprehensive but includes the number of SQL operations, the rows fetched, the number of fetch operations, the page size and the time used of the application resource by the thread.

The appearance of the information in data block 400 is simplified for illustration and thus in an actual application the information block may include more details than shown here. The number of fetch operations may also include select into operations since they also return data and are of interest in finding the cause of slowdowns. The remaining types of SQL operations are combined for the total count of SQL operations. This allows the system analyst to see how the number of data accessing operations compares to the total number of SQL operations in relation to the total amount of time for execution. For example, if the total amount of SQL operations is high, then that may explain the time used and there may not be a large result set from data accessing operations that is the cause of the excessive time.

Again referring to FIG. 4, data block 400 is intended to help the computer analyst to determine where system resources are being used and to pinpoint possible sources of periodic slowdowns due to large result sets returned from database accesses. The data block 400 allows the computer analyst to quickly pinpoint application resources that have an abnormally large number of rows fetched and/or abnormally large page size that may be the cause of the periodic slowdown. The data block 400 preferably shows one or more result sizes. The result size can be the size of any complex object generated or processed by the application server. In the illustrated embodiment, the result sizes are selected from the group consisting of-the number of rows fetched and the generated page size by the application server.

In the illustrated example shown in FIG. 4, it can be seen that Servlet 1 in the first two rows has 3 fetches of 10 and 5 rows and a corresponding page size of 200. In contrast, Servlet 1 in the thread associated with the third row has 3 fetches that fetch 250 rows from the database, has a page size of 2000 and a time of 40000. This third process or thread that calls Servlet 1 would be identified by the system analyst to be a likely source of a periodic slowdown. This process includes a particularly large result set (rows fetched) from the SQL operation. The analyst would be able to easily identify the application resource and the associated process that used a large amount of time and generated a large page size as a consequence of processing the SQL operation. Having found an abnormally large number of rows fetched and/or an abnormally large page size, the system analyst could then use this information to further isolate the problem. For example, the system analyst could analyze the SQL statement that requested the data to determine the cause of the slowdown, or examine the contents of the page to see why the page size is unusually large. Similarly, the analyst could observe whether an entity bean that accesses data without constructing a page has an abnormally high number of row fetches or time period that may also be a cause of a slowdown in system performance.

The amount of data created by the performance monitor and placed in the data block shown in FIG. 4 may be quite large. In a preferred embodiment, the performance monitor compares the entries in FIG. 4 to determine those entries that have an abnormally high number of rows fetched or an abnormally high page size with respect to other entries for the same application resource. The performance monitor then highlights those rows that have abnormally large result size (ie. rows fetched 410 or page size 420) with bold as shown in row three of FIG. 4. Other means of highlighting such as color or shading could also be used.

In a preferred embodiment, the data in the data block shown in FIG. 4 is produced by processing information collected and made available by prior art tools. In this embodiment, the performance monitor 127 (FIG. 1) processes data as shown in FIG. 2 that is supplied by a database monitor 126 with data such as shown in FIG. 3 from an application server 123. The performance monitor processes the data by finding all the corresponding records in the data block 200 for each record in the data block 300. Thus for a first record in FIG. 3, a thread ID of 16 is selected. The performance monitor then searches data block 200 for each record with a thread ID of 16. For each of these records with a thread ID of 16, the time stamp is checked to see if it falls between the start time and stop time of the thread being processed—in this case, between 12:00 and 12:04. If the time stamp falls within the time of the current thread ID, then the data from the data associated with the record is added to the data for all records for the current thread ID and time period. If the operation is a fetch, then the rows fetched are added together with the rows fetched from other records with the thread ID of 16 and the proper time period. This information is then stored in a row of the data block shown in FIG. 4. The associated page size and time is also stored in the data block 400.

Figure 5:
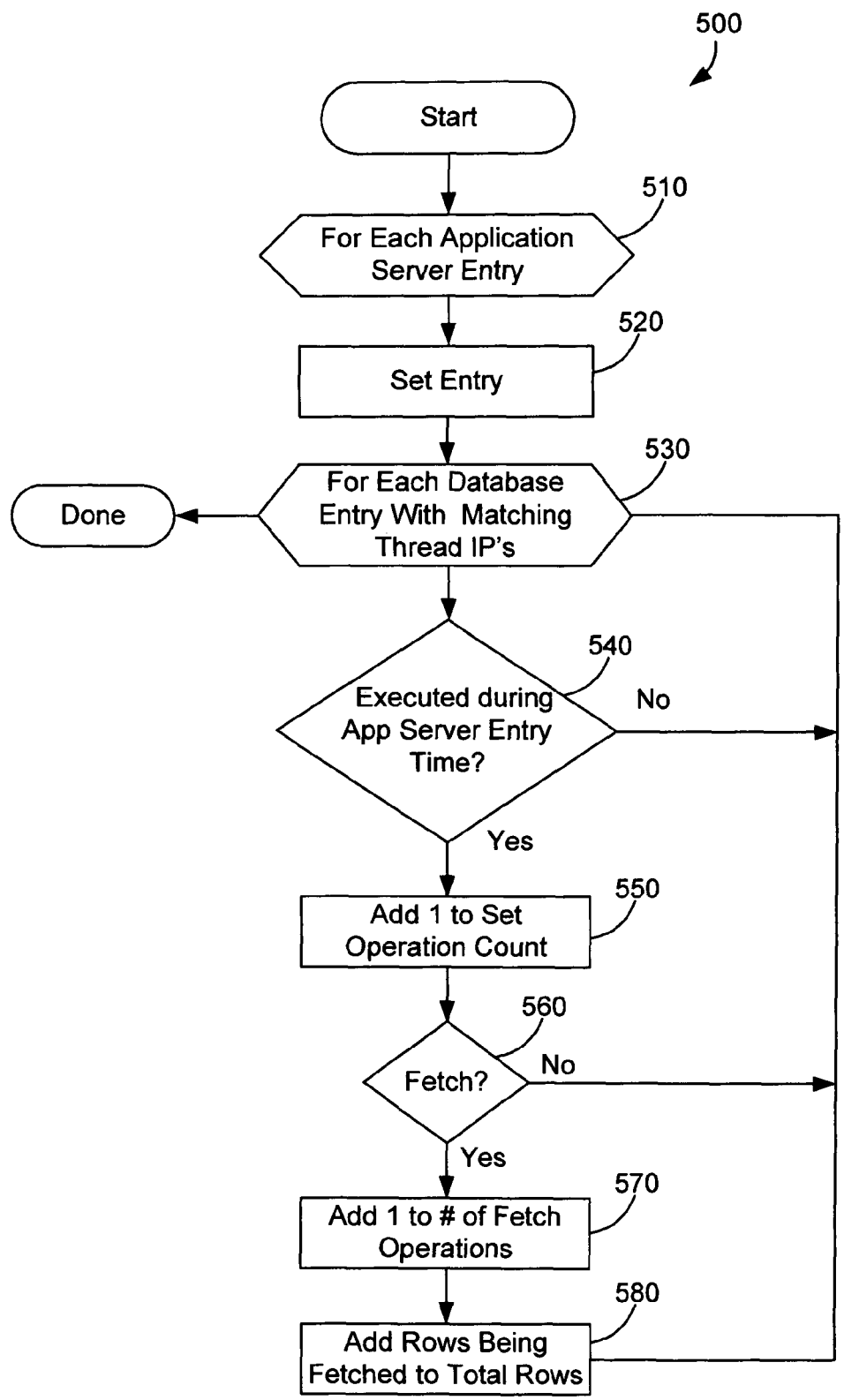
FIG. 5 shows a method flow diagram in accordance with a preferred embodiment.

FIG. 5 shows a method 500 of monitoring the performance via the result size according to a preferred embodiment. This preferred embodiment uses data collected and made available by prior art tools described above to produce an output that helps a computer system analyst to determine the cause of computer problems such as periodic slowdowns caused by access to a computer database. The method 500 selects each entry (step 510) to process from the application server data block. The selected entry (step 510) is then set as the current entry (step 520). The thread ID of the current entry (step 520) is then compared to the thread ID's in the data block of the data base monitor also described above. For each data base entry with a matching thread ID 530 to the current entry the method proceeds to process the data base entry by continuing to step 540. A database entry with a matching thread ID is first checked to determine if the entry was executed during the application server entry time (step 540) by determining if the time stamp of the entry is within the start and stop time of the application server entry. If the timestamp is not within the application server entry time (step 540=no), then the next database entry with a matching thread ID is processed (step 530). If the timestamp is within the application server entry time (step 540=yes) then the operation count is increased by one (step 550). The operation type is then checked to determine if the SQL operation is a fetch operation (step 560). If the operation is not a fetch operation (step 560=no) then the method continues with the next database entry with a matching thread ID is processed (step 530). If the operation is a fetch operation (step 560=yes) then the method continues by adding one (step 570) to the number of fetch operations for the current application server entry, and adds the number of rows for the data base entry to the total rows (step 580) associated with the current application server entry. (The total page size could also be collected and saved in the data block, but this step is not shown in FIG. 5.) The method then continues by processing the next data base entry with the same matching thread ID until all data base entries have been processed (step 530).

Figure 6:
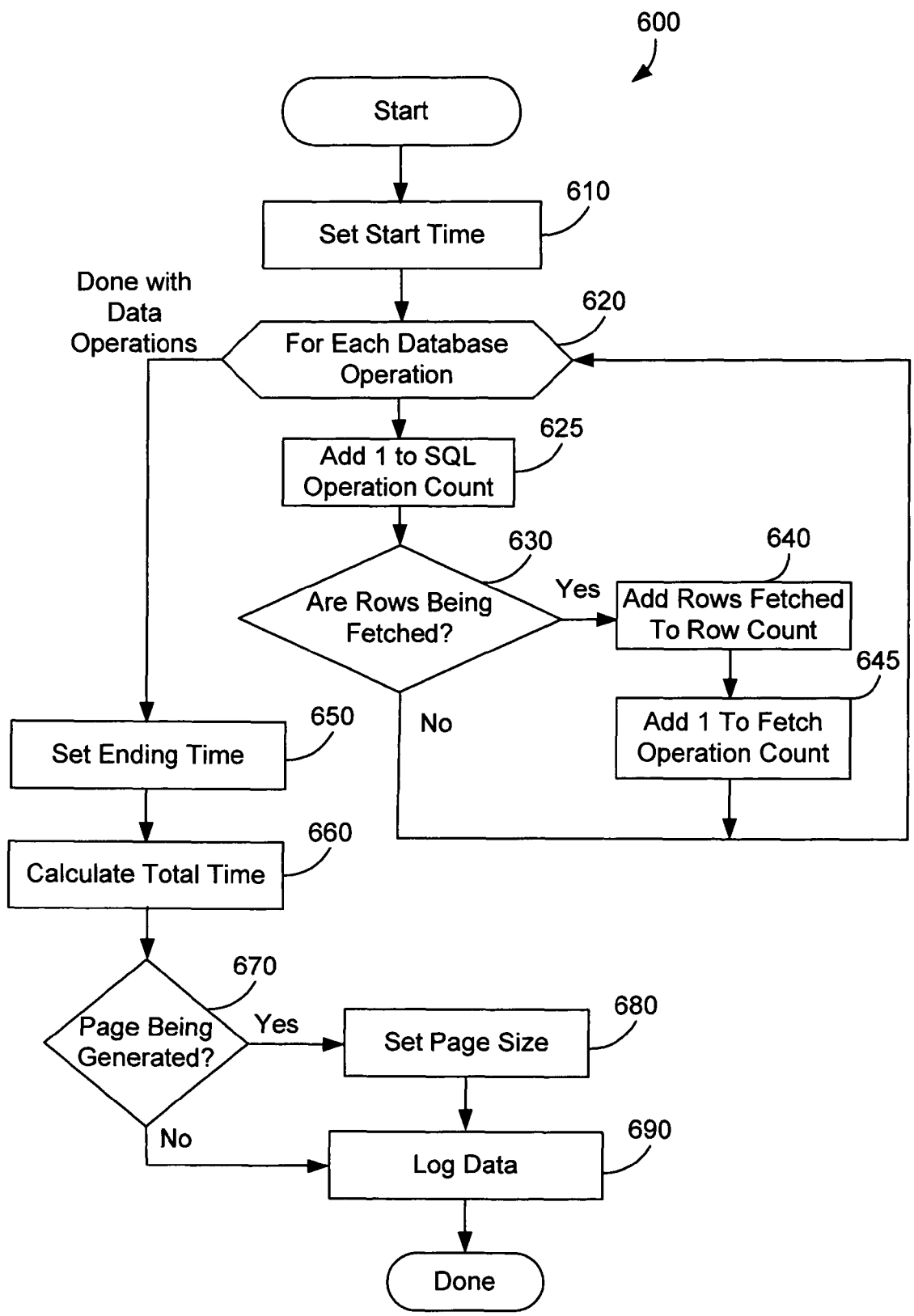
FIG. 6 shows a method flow diagram in accordance with another preferred embodiment.

FIG. 6 shows a method 600 of monitoring the performance via the result set size and page size according to another preferred embodiment. This preferred embodiment uses a modified application server or hooks available within an application server to collect the information to produce the data block 400 described above. This embodiment does not need to access the database monitor as described for the previous embodiment. In this embodiment the method 600 begins by the applications server setting the start time (step 610) at the beginning of processing an application resource such as a servlet. While processing the application resource, for each database operation (step 620) the application server adds one to the count of the SQL operations (step 625). The method 600 then determines whether rows are being fetched (step 630). If rows are being fetched (step 630=yes) then the row count is incremented by the number of rows fetched (step 640) and one is added to the fetch operation count (step 645). If rows are not being fetched, then the next database operation is examined by returning to step 620. When all the database operations are completed for the application resource (step 620 is done with database operations), the ending time is set for the application resource (step 650) and the total time is calculated (step 660) as the difference of the start time (step 610) and the ending time (step 650). The applications sever then determines whether a web page is being generated in response to the access to the database (step 670). If a page is being generated (step 670=yes) then the page size is determined and set (step 680) and the data is logged (step 690) and the method is done. If a page is not being generated (step 670=no) then the data is logged (step 690) and the method is done.

The present invention as described with reference to the preferred embodiments herein provides significant improvements over the prior art. In preferred embodiments the performance monitor correlates information of an application resource with the database access information to give a performance output that relates the performance of the application with a result size such as a result set of access to a database or a page size. The present invention provides a way to analyze and improve system performance particularly for periodic slowdowns that are related to large result sets being periodically returned from the database or large page sizes generated. This allows the system analysts to reduce the excessive costs caused by poor computer system performance.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer-implemented method for monitoring performance of a computer system with a performance monitor, the method comprising the steps of:
    (A) gathering data from a database monitor that monitors a database and from an application server to show correlated performance information from the database monitor and the application server about an application resource, where gathering data includes selecting entries from an application server log for the application server, and for each selected entry performing the following steps:
    (A1) comparing the entry from the application server log to operation entries in a database monitor;
    (A2) counting the number of operations entries where the time stamp of the database operation entry falls within the time of the selected entry from the application server log;
    (A3) counting the number of operation entries with in the previous step that are fetches; and
    (A4) counting the total number of rows fetched for the selected entry from the application server log; and
    (B) reporting a performance with correlated data entries from the data where the performance is based on the number of operations that are fetches in step (A3) and the number of rows fetched for each of the number of operations in step (A4) where reporting the performance comprises the steps of:
    (B1) displaying data determined in the previous steps;
    (B2) analyzing the data; and
    (B3) highlighting those entries with a high number of rows fetched and a large page size with respect to other entries.

2. The computer-implemented method of claim 1 wherein step (A) comprises the steps of:
    recording data for each application resource operation from the application server by performing the following steps:
        setting a start time for the application resource operations;
        for each database operation, count the number of operations entries, the number of operation entries that are fetches and the total number of rows fetched;
        setting a ending time and calculate the total time for the application resource;
        determining the page size if a web page is generated; and
        logging the data.

* * * * *